(12) United States Patent
Kawahito

(10) Patent No.: US 7,742,227 B2
(45) Date of Patent: Jun. 22, 2010

(54) MICROSCOPE APPARATUS

(75) Inventor: Takashi Kawahito, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/343,391

(22) Filed: Dec. 23, 2008

(65) Prior Publication Data

US 2009/0116103 A1 May 7, 2009

Related U.S. Application Data

(63) Continuation of application No. PCT/JP2007/063411, filed on Jun. 28, 2007.

(30) Foreign Application Priority Data

Jun. 30, 2006 (JP) .............................. 2006-180697

(51) Int. Cl.
*G02B 21/06* (2006.01)

(52) U.S. Cl. ...................... 359/390; 359/385; 359/392

(58) Field of Classification Search .................. 359/368, 359/385, 392, 390
See application file for complete search history.

(56) References Cited

U.S. PATENT DOCUMENTS

| 2001/0021064 A1* | 9/2001 | Toyoda et al. ............... 359/392 |
| 2007/0200569 A1* | 8/2007 | Watanabe et al. ........... 324/751 |

FOREIGN PATENT DOCUMENTS

| JP | 08-043741 A | 2/1996 |
| JP | 10-282430 A | 10/1998 |

* cited by examiner

*Primary Examiner*—Joshua L Pritchett
(74) *Attorney, Agent, or Firm*—Miles & Stockbridge P.C.

(57) ABSTRACT

Providing a microscope apparatus including an optical mount member capable of supporting various optical devices even without a large amount of space. A base body 10 arranged on a mount surface 9a of a vibration isolation table 9 is provided substantially perpendicularly to the mount surface 9a. A plurality of rails 32 through 36 are provided on the base body 31 vertically to the mount surface 9a so as to provide a plurality of extension optical devices such as a Galvanic scanner 64 to be combined with the microscope main body 10.

12 Claims, 4 Drawing Sheets

MICROSCOPE APPARATUS

CROSS-REFERENCE TO RELATED APPLICATION

This application is a continuation of International Application No. PCT/JP2007/063411 Jun. 28, 2007.

TECHNICAL FIELD

The present invention relates to a microscope apparatus including an optical device mount member that is useful in a case, for example, where an extension optical apparatus is used in combination with a main body of a microscope.

BACKGROUND ART

Inverted microscopes for biological observation have been conventionally known (see Japanese Patent Application Laid-Open No. 10-282430 and Japanese Patent Application Laid-Open No. 8-43741).

In some case, this type of inverted microscope is typically combined with a laser manipulator for manipulating micro objects in cells and an optical system for high SN fluorescent observation by total internal reflection illumination.

The optical system of the laser manipulator and the optical system of high SN fluorescent observation mentioned above are disposed in such a way as to surround the microscope mounted on a base (e.g. vibration isolation table).

Therefore, there arises a problem that when an extension optical device is to be used in combination with a microscope, a large mount space is required.

DISCLOSURE OF THE INVENTION

The present invention has been made in view of the above described problem, and an object of the invention is to provide a microscope apparatus including an optical device mount member with which a number of extension optical apparatuses can be mounted in a small mount space.

To solve the above described problem, according to a first aspect of the present invention, there is provided a microscope apparatus characterized by comprising, a microscope main body, a stage provided in said microscope main body on which a specimen is to be placed, an observation optical system provided in said microscope main body and including an objective lens that forms an image of the specimen on said stage, an eyepiece portion provided at one end of said microscope main body for observation of said specimen through said observation optical system, and an optical device mount member provided at an end of said microscope main body other than said one end of said microscope main body, the optical device mount member supporting various extension optical devices and extending perpendicularly to a mount surface of said microscope main body, wherein said extension optical devices are to be provided on both a first mount surface of said optical device mount member facing toward said stage and a second mount surface of said optical device mount member on the rear side of said first mount surface.

In the first aspect of the present invention, it is preferred that an adjusting member for adjustment of a position of said extension optical device with respect to the optical axis direction be provided on said second mount surface of said optical device mount member.

In the first aspect of the present invention, it is preferred that said optical device mount member support one end of said stage, and as said extension optical device, a laser light source be mounted on said second mount surface.

In the first aspect of the present invention, it is preferred that that a transmission illumination apparatus be provided on said first mount surface side of said optical device mount member, and an optical apparatus for total internal reflection illumination be provided on said second mount surface side of said optical device mount member.

In the first aspect of the present invention, it is preferred that said optical device mount member comprise a rectangular flat plate, a plurality of guide rails be provided along a horizontal direction on said second mount surface side of said optical device mount member, and a plurality of said extension optical devices be mounted on said guide rails in such a way that the positions thereof can be adjusted.

In the first aspect of the present invention, it is preferred that the plurality of extension optical devices provided on said second mount surface side of said optical device mount member comprise a plurality of illumination apparatus and a switching device that select any one of said illumination apparatuses.

According to the present invention, a number of optical apparatuses can be mounted in a small mount space.

EMBODIMENT OF THE INVENTION

In the following, an embodiment of the present invention will be described based on the drawings.

Figure 1:
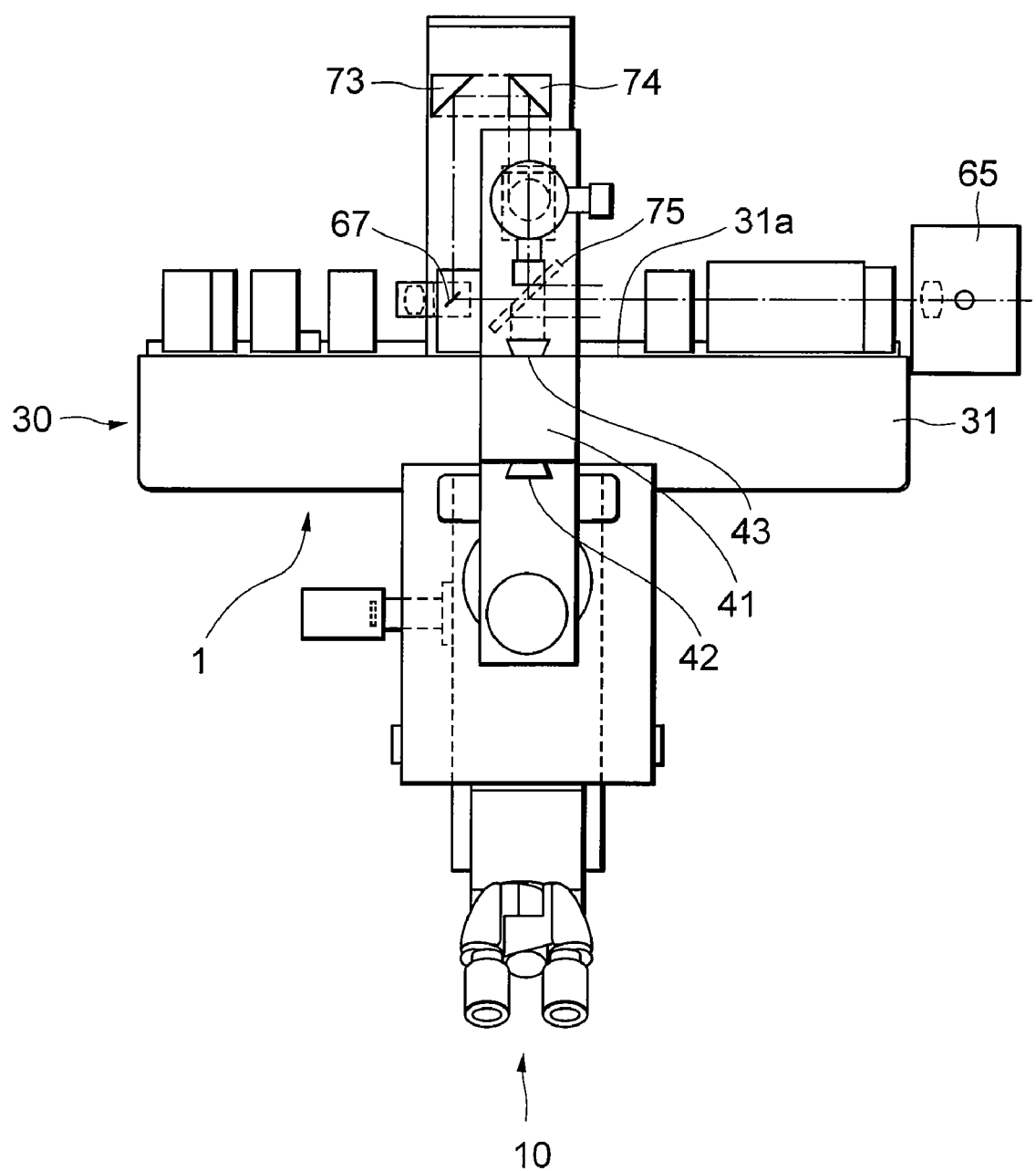
FIG. 1 is a plan view of a microscope apparatus according to an embodiment of the present invention.
Figure 2:
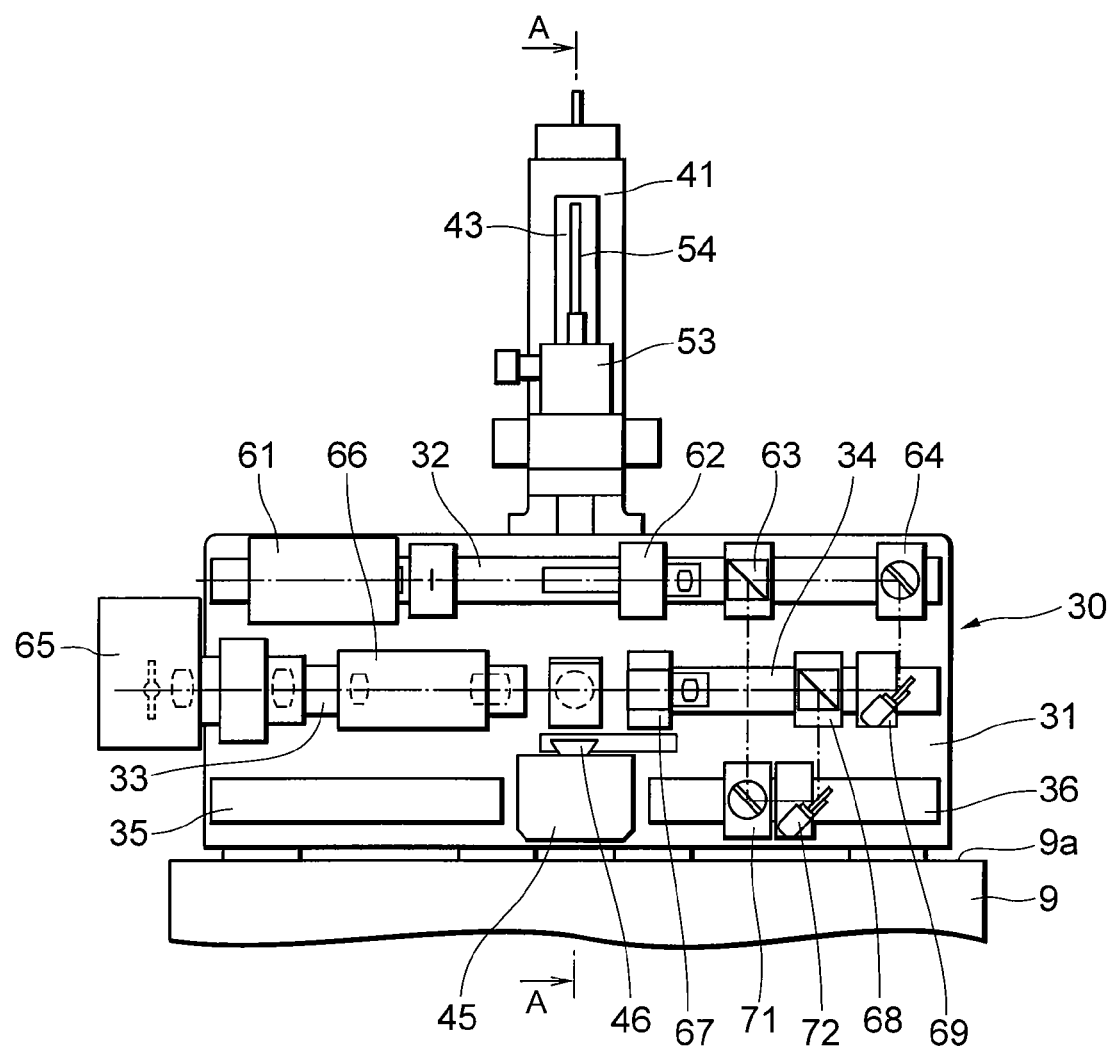
FIG. 2 is a rear view of the microscope apparatus shown in FIG. 1.
Figure 3:
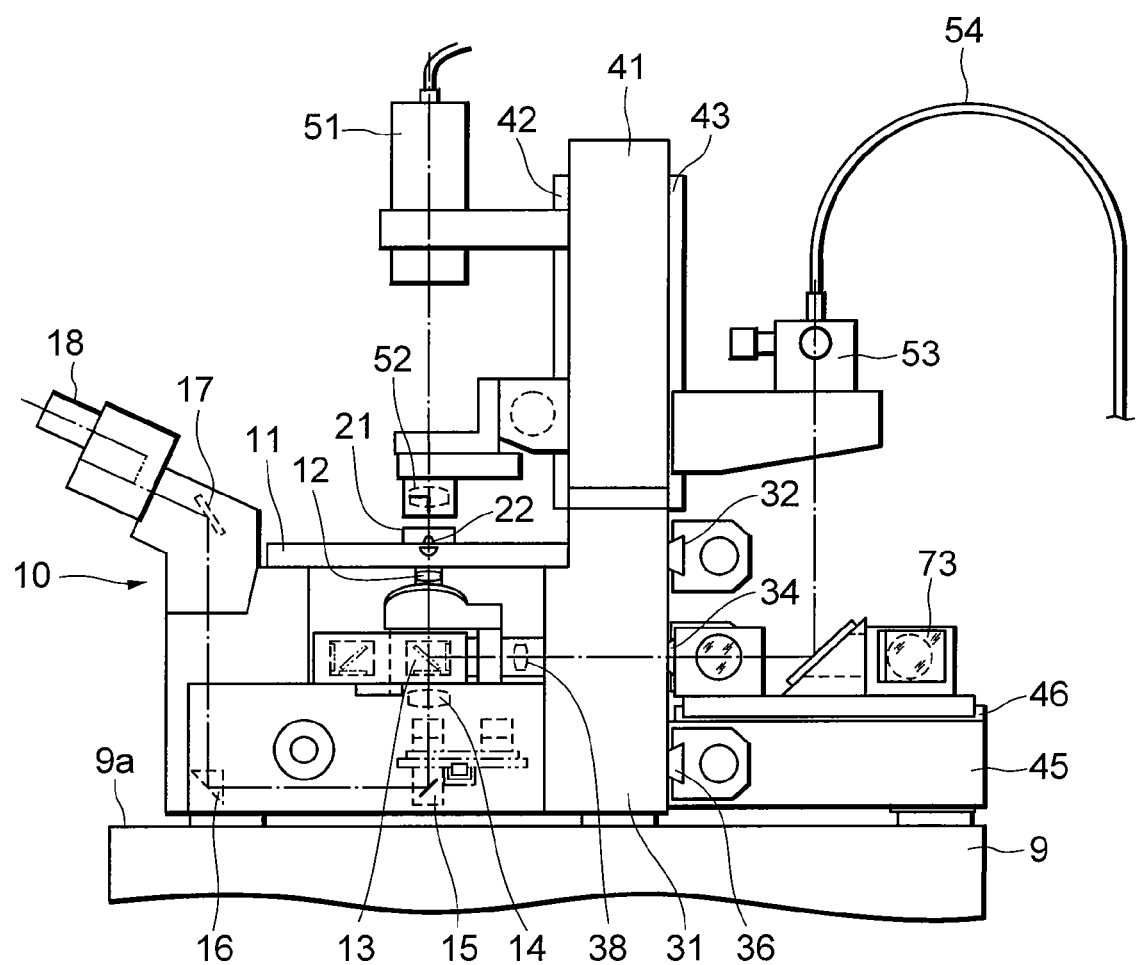
FIG. 3 is a schematic diagram showing a cross section taken along line A-A in FIG. 2.
Figure 4:
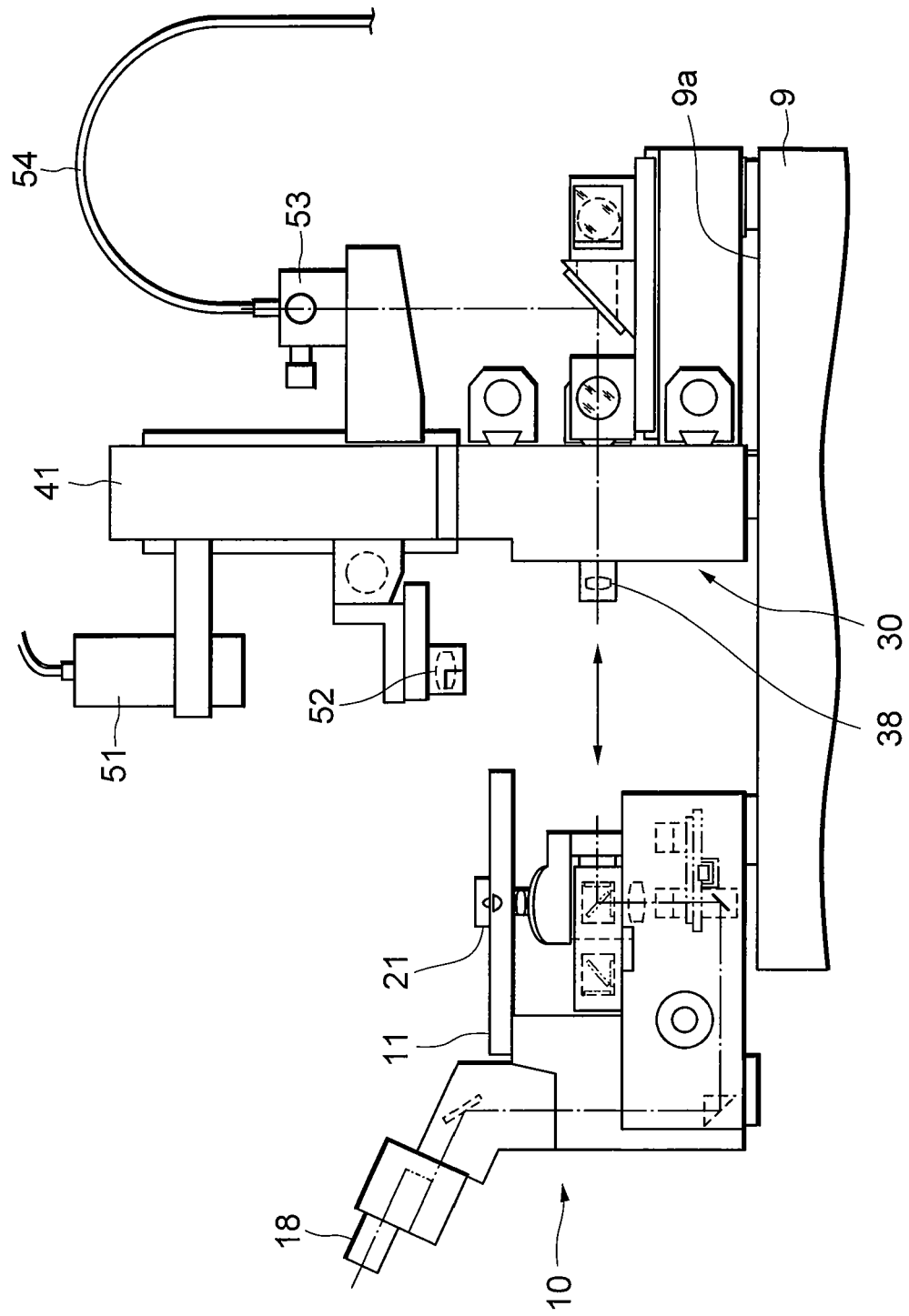
FIG. 4 is a side view showing a state in which the main body of a microscope has been dismounted from the microscope apparatus shown in FIG. 1.

FIG. 1 is a plan view of a microscope apparatus according to an embodiment of the present invention. FIG. 2 is a rear view of the microscope apparatus shown in FIG. 1. FIG. 3 is a schematic diagram showing a cross section taken along line A-A in FIG. 2. FIG. 4 is a side view showing a state in which the main body of a microscope has been dismounted from the microscope apparatus shown in FIG. 1.

As shown in FIGS. 1 to 3, the microscope apparatus 1 is composed of a base for optical apparatus (optical device mount member) 30 and a microscope main body 10.

The microscope main body 10 has a stage 11, a first objective lens 12, a filter block 13, a second objective lens 14, prisms 15, 16, a mirror 17 and an eyepiece lens 18 etc. A Petri dish 21 in which cells 22 are stored is set on the stage 11.

The optical apparatus base (optical device mount member) 30 has a base body (rectangular flat plate) 31 and a plurality of rails (adjusting members) 32 to 36. The base body 31 is disposed on a mount surface 9a of a vibration isolation table 9 (see FIG. 1). The front surface (first mount surface) and the rear surface (second mount surface) 31a of the base body 31 are substantially perpendicular to the mount surface 9a of the vibration isolation table 9.

The rail 32 is provided on an upper portion of the mount surface 31a of the base body 31. The rails 33 and 34 are provided on an intermediate portion with respect to the vertical direction on the mount surface 31a of the base body 31. The rails 35 and 36 are provided on a lower portion of the mount surface 31a of the base body 31. The rails 32 to 36 extend in a substantially horizontal direction. The cross sectional shape of the rails 32 to 36 is a substantially inverted trapezoidal shape with the width dimension increasing away from the mount surface 31a. A lens (coupling portion) 38 for coupling to an optical apparatus such as the microscope main body 10 is provided in front of the base body 31.

A support post 41 is joined to the top surface of the base body 31. A rail 42 is provided on the front surface of the support post 41, and a rail 43 is provided on the rear surface of the support post 41. The rails 42 and 43 extend in a substantially horizontal direction. The cross sectional shape of the rails 42 and 43 is the same as the cross sectional shape of the rails 32 to 36.

A leg 45 is joined to the lower portion of the mount surface 31a of the base body 31. The leg 45 supports the base body 31 from its rear side. A rail 46 is provided on the top surface of the leg 45.

A transmission illumination floodlight lamp 51 and a condenser lens 52 are movably mounted on the rail 42 of the support post 41. An optical apparatus 53 for total internal reflection illumination is movably mounted on the rail 43 of the support post 41. The optical apparatus 53 for total internal reflection illumination is connected with a light source (not shown) by an optical fiber 54.

On the rail 32 of the optical apparatus base 30 are mounted a laser light source 61, a beam expander 62, a beam splitter 63 and a Galvano scanner 64 in such a way as to be movable in the longitudinal direction of the rail 32.

On the rail 33 of the optical apparatus base 30 are mounted a mercury lamp house 65 and an epi-illumination apparatus 66 in such a way as to be movable in the longitudinal direction of the rail 33.

On the rail 34 of the optical apparatus base 30 are mounted a mirror 67, a beam splitter 68 and a Galvano scanner 69 in such a way as to be movable in the longitudinal direction of the rail 34.

On the rail 36 of the optical apparatus base 30 are mounted Galvano scanners 71 and 72 in such a way as to be movable in the longitudinal direction of the rail 36.

On the rail 46 of the leg 45 are mounted two dichroic mirrors 73 and 74 and a semi-transparent mirror 75 in such a way as to be movable in the longitudinal direction of the rail 46 (see FIG. 1).

In this embodiment, the above-mentioned laser light source 61, beam expander 62, beam splitters 63 and 68, Galvano scanners 64, 69, 71 and 72, mirrors 73 and 74, mirror 67, dichroic mirror 75, mercury lamp house 65 and epi-illumination apparatus 66 etc. correspond to extension optical apparatuses.

Next, an exemplary observation method using an extension optical apparatus in the form of the laser light source 61 mounted on the mount surface 31a of the optical apparatus base 30 will be described.

A laser beam emitted from the laser source 61 having a wavelength in the near infrared region (invisible ray) is transmitted through the beam expander 62 and split into two beams by the beam splitter 63. One of the beams is reflected by the Galvano scanners 64 and 69, transmitted through the beam splitter 68 and reflected by the mirror 67. The other beam is reflected by the Galvano scanners 71 and 72, further reflected by the beam splitter 68 and reflected by the mirror 67 together with the one beam. These two beams are reflected by the mirrors 73 and 74, transmitted through the dichroic mirror 75 and led to the microscope 10. Simultaneously, excitation light emitted from the mercury lamp house 65 passes through the epi-illumination apparatus 66 and is reflected by the dichroic mirror 75 to thereby be synthesized with the two beams.

The beams and excitation light pass through the lens 38 and are reflected by the dichroic mirror in the filter block 13 to illuminate cells 22, which have been stained with a fluorescent dye in advance, in the Petri dish 21 through the objective lens 12. In this process, it is possible to move micro materials in the observation field by changing the orientations of the Galvano scanners 64 and 69 and Galvano scanners 71 and 72 to change the directions of the two beams.

The fluorescent light colored in the cells 22 is changed into parallel light by the first objective lens 12 and passes through the filter block 13, and an image of the cells 22 is formed by the second objective lens 14. This image is introduced to the eyepiece lens 18 by the prisms 15, 16 and the mirror 17 and magnified by the eyepiece lens 18 for observation.

Besides the above described observation method, an observation method using light emitted from the total internal reflection illumination optical apparatus 53 and an ordinary observation method using light emitted from the transmission illumination floodlight lamp 51 may also be performed. An optical device, such as a reflection mirror or a shutter, for switching over the optical paths of the respective light sources is provided on the base body 31 so that the light source suitable for the user's observation method can be selected.

As shown in FIG. 4, the microscope 10 is mountable/dismountable on/from the optical apparatus base 30. Therefore, the microscope main body 10 can be replaced by another microscope and can be used in combination with an optical apparatus other than a microscope. In such cases, alignment with the optical axis of the optical apparatus such as the microscope main body 10 can be performed easily through the lens 38 for coupling in front of the optical apparatus base 30.

According to this embodiment, it is possible to dispose extension optical apparatuses such as Galvano scanners at multiple levels on the mount surface 31a that is substantially perpendicular to the mount surface 9a. Therefore, a number of extension optical apparatuses can used in combination with the microscope main body 10 even without a large mount space.

Although in this embodiment the support post 41 and the base body 31 are constructed as separate members, the present invention is not limited by this. They may be constructed integrally.

Although in this embodiment, the microscope main body is exemplified by an inverted microscope, the present invention is not limited by this and applicable also to an erecting microscope.

What is claimed is:

1. A microscope apparatus comprising:
   a microscope main body configure to be disposed on a table mount surface;
   a stage provide in said microscope main body on which a specimen is to be placed;
   an observation optical system provided in said microscope main body and including an objective lens to form an image of the specimen on said stage;
   an eyepiece portion provided at one end of said microscope main body for observation of said specimen through said observation optical system;
   an optical device mount member provided at an end of said microscope main body, other than said one end of said microscope main body, the optical device mount member being constructed to support various extension optical devices and configured to be disposed on the table mount surface so as to extend perpendicularly to the table mount surface, the optical device mount member further having a first mount surface on a first side of the optical device mount member facing toward said stage and a second mount surface on an opposite side of the optical device mount member; and a leg member arranged to be disposed on the table mount surface and connected to the second mount surface so as to support the optical device mount member, wherein the first and second mount surfaces are each configured to support respective ones of the extension optical devices, and the leg member has, at an upper surface thereof, a third mount surface configured to support an additional extension optical device thereon.

2. A microscope apparatus according to claim 1, further comprising an adjusting member for adjustment of a position of one of said extension optical devices with respect to an optical axis direction, wherein the adjusting member is provided on said second mount surface of said optical device mount member.

3. A microscope apparatus according to claim 2, wherein said optical device mount member supports one end of said stage, and a laser light source is provided as one of said optical extension devices, the laser light source being mounted on said second mount surface.

4. A microscope apparatus according to claim 1, wherein a transmission illumination apparatus and an optical apparatus for total internal reflection illumination are provided as ones of said extension optical devices, the transmission illumination apparatus is provided on said first mount surface, and the optical apparatus for total internal reflection illumination is provided on said second mount surface.

5. A microscope apparatus according to claim 1, wherein said optical device mount member comprises a rectangular flat plate, a plurality of guide rails extending in a substantially horizontal direction are provided on said second mount surface of said optical device mount member, and a plurality of said extension optical devices are mounted on said guide rails in such a way that the positions of said plurality of extension optical devices can be adjusted.

6. A microscope apparatus according to claim 5, wherein the extension optical devices provided on said second mount surface include a plurality of illumination apparatuses and a switching device that selects any one of said illumination apparatuses.

7. A microscope apparatus according to claim 1, further comprising a table having the table mount surface thereon.

8. A microscope apparatus according to claim 1, wherein the optical device mount member has a hole extending between the first and second mount surfaces through which light can pass.

9. A microscope apparatus comprising:
a microscope main body;
a stage provided in said microscope main body on which a specimen is to be placed;
an observation optical system provided in said microscope main body and including an objective lens to form an image of the specimen on said stage;
an eyepiece portion provided at one end of said microscope main body for observation of said specimen through said observation optical system; and
an optical device mount member provided at an end of said microscope main body other than said one end of said microscope main body, the optical device mount member being constructed to support various extension optical devices and configured to extend perpendicularly to a mount surface for said microscope main body, wherein said optical device mount member includes a rectangular flat plate having a first mount surface on a first side of the rectangular flat plate facing toward the stage and a second mount surface on an opposite side of the rectangular flat plate,
the first and second mount surfaces are each configured to support respective ones of the extension optical devices,
a plurality of guide rails extending in a substantially horizontal direction are provided on the second mount surface,
a plurality of the extension optical devices are mounted on the guide rails such that the positions thereof can be adjusted, and
the extension optical devices provided on the second mount surface include a plurality of illumination apparatuses and a switching device that selects any one of said illumination apparatuses.

10. A microscope apparatus according to claim 9, further comprising a leg member connected to the second mount surface so as to support the optical device mount member.

11. A microscope apparatus according to claim 10, further comprising a table having a table mount surface, wherein the microscope main body, the optical device mount member, and the leg member are each disposed on the table mount surface.

12. A microscope apparatus comprising:
a microscope main body configured to be disposed on a table mount surface;
a stage provided in said microscope main body on which a specimen is to be placed;
an observation optical system provided in said microscope main body and including an objective lens to form an image of the specimen on said stage;
an eyepiece portion provided at one end of said microscope main body for observation of said specimen through said observation optical system;
an optical device mount member provided at an end of said microscope main body other than said one end of said microscope main body, the optical device mount member being constructed to support various extension optical devices and configured to be disposed on the table mount surface so as to extend perpendicularly to the table mount surface, the optical device mount member further having a first mount surface on a first side of the optical device mount member facing toward said stage and a second mount surface on an opposite side of the optical device mount member; and
a leg member arranged to be disposed on the table mount surface and connected to the second mount surface so as to support the optical device mount member,
wherein the first and second mount surfaces are each configured to support respective ones of the extension optical devices,
said optical device mount member comprises a rectangular flat plate, a plurality of guide rails extending in a substantially horizontal direction are provided on said second mount surface of said optical device mount member, a plurality of said extension optical devices are mounted on said guide rails in such a way that the positions of said plurality of extension optical devices can be adjusted, and
the extension optical devices provided on said second mount surface include a plurality of illumination apparatuses and a switching device that selects any one of said illumination apparatuses.

* * * * *